United States Patent [19]

Herz

[11] Patent Number: 5,262,861
[45] Date of Patent: Nov. 16, 1993

[54] COMPUTER CONTROLLABLE VIDEO SYNCHRONIZATION AND FRAME PULSE SIGNAL GENERATOR

[75] Inventor: William S. Herz, Newark, Calif.

[73] Assignee: Sony Electronics Inc., Park Ridge, N.J.

[21] Appl. No.: 873,578

[22] Filed: Apr. 21, 1992

Related U.S. Application Data

[63] Continuation of Ser. No. 546,385, Jun. 29, 1990.

[51] Int. Cl.[5] .................... H04N 5/06; H04N 5/04
[52] U.S. Cl. ................... 358/150; 358/148; 395/163; 364/270.6; 345/213
[58] Field of Search ............ 358/150, 17, 19, 148, 358/149, 151, 903, 140, 11, 181, 154; 395/100, 162, 163; 364/270.6, 271.1, 927.4; 340/814

[56] References Cited

U.S. PATENT DOCUMENTS

| | | | |
|---|---|---|---|
| 4,169,659 | 10/1979 | Marlowe | 358/150 |
| 4,328,513 | 5/1982 | Furihato et al. | 358/19 |
| 4,562,457 | 12/1985 | Salvia | 358/19 |
| 4,872,054 | 10/1989 | Gray et al. | 358/140 |
| 4,897,723 | 1/1990 | Arai | 358/158 |
| 4,931,872 | 6/1990 | Stoddard et al. | 358/183 |
| 4,951,142 | 8/1990 | Glaab et al. | 358/148 |
| 4,958,227 | 9/1990 | Wan | 358/148 |
| 4,964,069 | 10/1990 | Ely | 364/521 |
| 5,027,212 | 6/1991 | Marlton et al. | 358/183 |

FOREIGN PATENT DOCUMENTS 57-18150 5/1982 Japan .

OTHER PUBLICATIONS

E. H. Nielsen, Colloque International Sur La Television En Couleur, Paris, Mar. 25th-29th, 1968, pp. 1-8.

Primary Examiner—James J. Groody
Assistant Examiner—Safet Metjahic
Attorney, Agent, or Firm—Limbach & Limbach

[57] ABSTRACT

A self-contained, computer controllable, video synchronization and frame pulse signal generator for generating a video synchronization signal, such as video black burst, and a video frame pulse signal indicating the presence of a video signal frame. The present invention can be connected as a subsystem within an existing personal computer having an open architecture (e.g., as a plug-in interface board in a PC-AT ®). The video synchronization signal is useful as a master synchronization signal source within a video signal processing system (e.g., an off-line video editing system). The video frame pulse signal is synchronized to the video synchronization signal and can be selectively gated under computer control to produce an interrupt signal useful as a stimulus for a computer's software interrupt routines within a video signal processing system. In an alternative embodiment, computer controllable switches are included for programmably selecting among additional video synchronization and frame pulse signals (e.g., NTSC, PAL, SECAM or HDTV), which can be generated either internally or externally. The selected video synchronization and frame pulse signals are used as the master synchronization signal source and interrupt signal, respectively.

18 Claims, 4 Drawing Sheets

COMPUTER CONTROLLABLE VIDEO SYNCHRONIZATION AND FRAME PULSE SIGNAL GENERATOR

This is a continuation of co-pending application Ser. No. 07/546,385 filed on Jun. 29, 1990.

BACKGROUND OF THE INVENTION

1. Field of the Invention

The present invention relates to video synchronization signal generators, and in particular, to computer controllable video synchronization signal generators.

2. Description of the Related Art

Modern video systems typically require the use of numerous peripheral video subsystems which must all be synchronized with one another. Further, most sophisticated video systems, such as video signal processors or work stations, require the use of a computer to control the various video peripherals or to perform some form of data processing. Therefore, a video synchronization ("sync") signal source is required for supplying each of the peripheral video subsystems with a common video sync signal. Further required is a means by which the computer can interface with the various video peripherals so as to supply them with appropriate control signals and to receive from the video peripherals any data it requires.

Typically, a stand-alone video sync signal source, several of which are known in the art, is used to supply a common video sync signal source, such as a video black burst signal. Its output signal, i.e., the video sync signal, is coupled to each video peripheral. A drawback to this, however, is that several video sync signal sources are required if video sync signals based upon several different video standards (e.g., NTSC, PAL, SECAM) are desired. Furthermore, even if several such video sync signal sources are available, selecting the desired video sync signal from among these sources requires the manual disconnection and reconnection of the various video peripherals to the desired video sync signal source. Alternatively, the computer can be used to control a video signal switch to select from among the various video sync signal sources. However, this requires the use of yet another computer interface.

The interface between the computer and the various video peripherals is typically accomplished by way of a standard interface protocol, such as RS422. With a serial RS-422 interface, each peripheral can communicate with the computer to indicate when the peripheral is in need of servicing, e.g., when it needs instructions or has data available for processing by the computer. However, transfer of instructions or data between the computer and peripherals must take place only during specific time periods within each video frame.

This requires the use of some form of video frame pulse signal, synchronized to the common video sync signal, which can be used for determining the proper timing for transfer of instructions or data. Based upon this video frame pulse signal, an interrupt request signal must then be generated by each peripheral to send to the computer. Thus, each video peripheral must be provided with such a video frame pulse signal, or alternatively, have some decoding circuitry for decoding an appropriate frame pulse signal based upon the common video sync signal.

If a video frame pulse signal must be distributed along with the video sync signal, the aforementioned dilemma associated with multiple peripherals becomes worse, i.e, having to manually disconnect and reconnect multiple peripherals or provide a computer controlled video signal switch when several video sync signals are used (e.g., NTSC, PAL, SECAM). Further, such decoding circuitry can be rather complex if video sync signals based upon several video standards are to be used within the video system.

Therefore, it would be desirable to have a self-contained unit in which a computer controllable switching means can programmably select a common video sync signal from among multiple video sync signals which are based upon different video standards. It would be further desirable to have as part of such a unit a common video sync signal source from which a common video frame pulse signal can be derived and used by the computer for determining the proper timing for transferring of instructions or data.

SUMMARY OF THE INVENTION

A computer controllable video synchronization and frame pulse signal generator in accordance with the present invention has a video synchronization ("sync") signal generator for providing a common video sync signal for a video system. Further provided is a video frame pulse signal generator which provides a video frame pulse synchronized to the video sync signal. The video frame pulse signal can selectively be free-running or gated. The gating of the video frame pulse signal is computer controllable. This allows a computer within a video system to determine, in accordance with the video frame pulse signal, when to properly generate an interrupt request signal for prompting the transfer of instructions or data.

The signal generator of the present invention is constructed as a self-contained unit to be included as a plug-in subsystem within a computer.

The present invention further provides a selfcontained computer controllable switching means by which one of several different video sync signals, and corresponding video frame pulse signals, can be selected. The selected video sync signal can be used as the common video sync signal within a video system, and the selected video frame pulse signal can be gated for generating an appropriate interrupt request signal.

These and other objectives, features and advantages of the present invention will be readily understood upon consideration of the following detailed description of the invention and the accompanying drawings.

BRIEF DESCRIPTION OF THE DRAWINGS

Throughout the figures, corresponding elements therein are designated with like numerals.

DETAILED DESCRIPTION OF THE INVENTION

Figure 1:
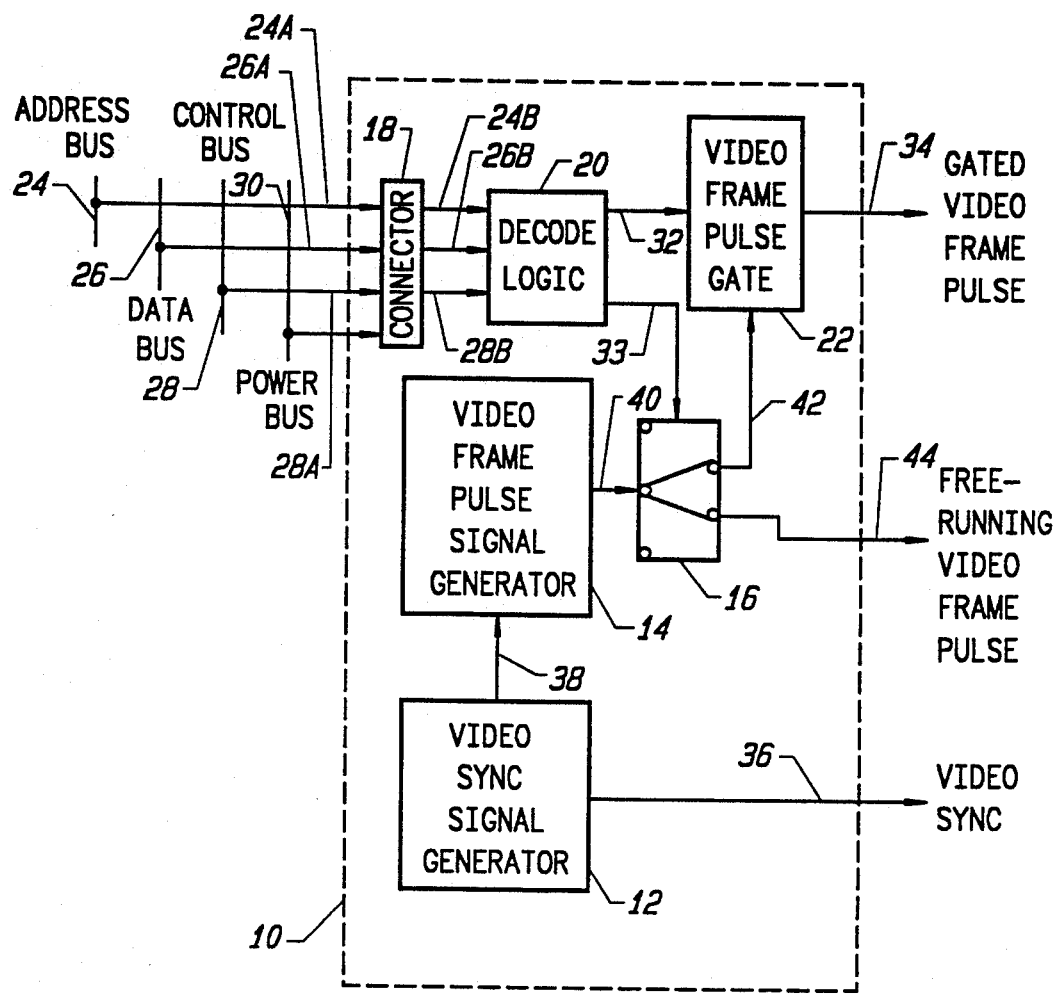
FIG. 1 illustrates in simplified, functional block diagram form a preferred embodiment of a computer controllable video synchronization and frame pulse signal generator in accordance with the present invention.

Referring to FIG. 1, a preferred embodiment of a computer controllable video synchronization ("sync") and frame pulse signal generator 10 in accordance with the present invention consists of: a video sync signal generator 12; a video frame pulse signal generator 14; a signal switch 16; an electrical connector 18 with multiple conductors; a set of decoding logic 20; and a video frame pulse gate circuit 22. The foregoing functional circuit elements are coupled as shown in FIG. 1 and mounted on a printed circuit board which is adapted for being plugged in as an interface board in a personal computer having an open architecture, i.e., a personal computer in which the internal signal buses are accessible (e.g., PC-AT ®, PC-compatible computers, etc.). When so installed into a computer, the connector 18 provides the means by which the signal generator 10 couples to several buses within the computer, e.g., the address bus 24, data bus 26, control bus 28 and power bus 30.

The power bus 30 within the computer provides the necessary DC power for the signal generator 10. The address 24, data 26 and control 28 buses selectively provide an address signal 24a, a data signal 26a, and control signal 28a, respectively. After these signals 24a, 26a, 28a are coupled through the connector 18, corresponding address 24b, data 26b and control 28b signals are coupled into the decoding logic 20 for generating a pulse gate control signal 32 and, optionally, a signal switch control signal 33. The pulse gate control signal 32 is used to control the video frame pulse gate 22, as discussed below, to generate a gated video frame pulse signal 34. The optional signal switch control signal 33 is used to control the signal switch 16, as discussed below. It will be appreciated that these control signals 32, 33 can be identical signals and share a common signal path.

The video sync signal generator 12 generates a video sync signal 36 to be used as a master sync signal source within a video system, such as an off-line video editing system. Such a video sync signal 36 can consist of a video black burst signal or virtually any type of video sync signal deemed useful for a given video system (e.g., high definition video tri-level sync). The video sync signal generator 12 further provides a frame sync signal 38 for use by the video frame pulse signal generator 14. The video frame pulse signal generator 14 uses this frame sync signal 38 for generating its output signal 40, i.e., a video frame pulse signal, and synchronizing it with the video sync signal 36.

The video frame pulse signal 40 is coupled into the signal switch 16. The signal switch 16 is functionally two independently operable single pole, single throw switches, into the throws (or common throw, as shown in FIG. 1) of which the video frame pulse signal 40 is coupled. The switched, i.e., selected, outputs at the poles of the switch 16 are then a video frame pulse signal 42 which is coupled into the video frame pulse gate 22, a free-running video frame pulse signal 44, or both, or neither. In other words, the switch 16 is configured to allow the video frame pulse signal 40 to be coupled out as a signal 42 transferred to the video frame pulse gate 22 only, to be coupled out as a free-running video frame pulse signal 44 only, coupled out as both signals 42, 44 simultaneously, or not coupled out at all.

It will be appreciated that the signal switch 16 can consist of virtually any form of electrical coupling or switching means. For example, the signal switch 16 can simply be a conductive jumper used to selectively couple to one or both of two possible signal paths. Alternatively, the signal switch 16 can be a solid state electronic switch or an electromechanical switch selectively controlled by the signal switch control signal 33.

If the output signal 40 of the video frame pulse signal generator 14 is coupled by the switch 16 directly out as a free-running video frame pulse signal 44, the frame pulse signal 44 is not gated and simply represents the presence of a video signal frame within the video sync signal 36. However, if the output signal 40 is coupled as the frame pulse signal input 42 to the video frame pulse gate 22, it becomes a gated video frame pulse signal 34, dependent upon the decoded gate control signal 32. This control signal 32, in turn, is dependent upon the signals 24b, 26b, 28b received via the signal buses 24, 26, 28 within the computer (not shown) and the design of the decoding logic 20.

It will be appreciated that many possible combinations or permutations of address signals 24b, data signals 26b, control signals 28b and decode logic 20 designs exist for generating a pulse gate control signal 32 or signal switch control signal 33. Selection of the appropriate signals 24b, 26b, 28b and decode logic 20 design will depend upon each individual application. It will be further appreciated that the signals received from the computer, as well as the signals derived therefrom, can be single-bit or multiple-bit signals, as desired.

For example, in a preferred embodiment of the present invention, the address signal 24b consists of an eight-bit wide address signal received from the address bus 24 which is decoded within the decoding logic 20 to determine whether the particular interface board on which the signal generator 10 is mounted has been addressed by the host computer (not shown). Additionally, a control signal 28b is used which consists of, among other signals as desired, a two-bit signal representing the status of the input/output ("I/O") read and write flags within the host computer.

Thus, as controlled by the host computer, the gate control signal 32 gates the frame pulse signal 42 within the video frame pulse gate circuit 22 to produce a gated video frame pulse signal 34. This gated video frame pulse signal 34 can be used as an interrupt request signal for the host computer, e.g., as a stimulus for the host computer's software interrupt routines. This is useful in avoiding interrupting the host computer at inappropriate access times. Also as controlled by the host computer, the optional signal switch control signal 33 allows for programmable operation of the signal switch 16 to produce a gated video frame pulse signal 34, a free-running video frame pulse 44, or both, or neither.

Figure 2:
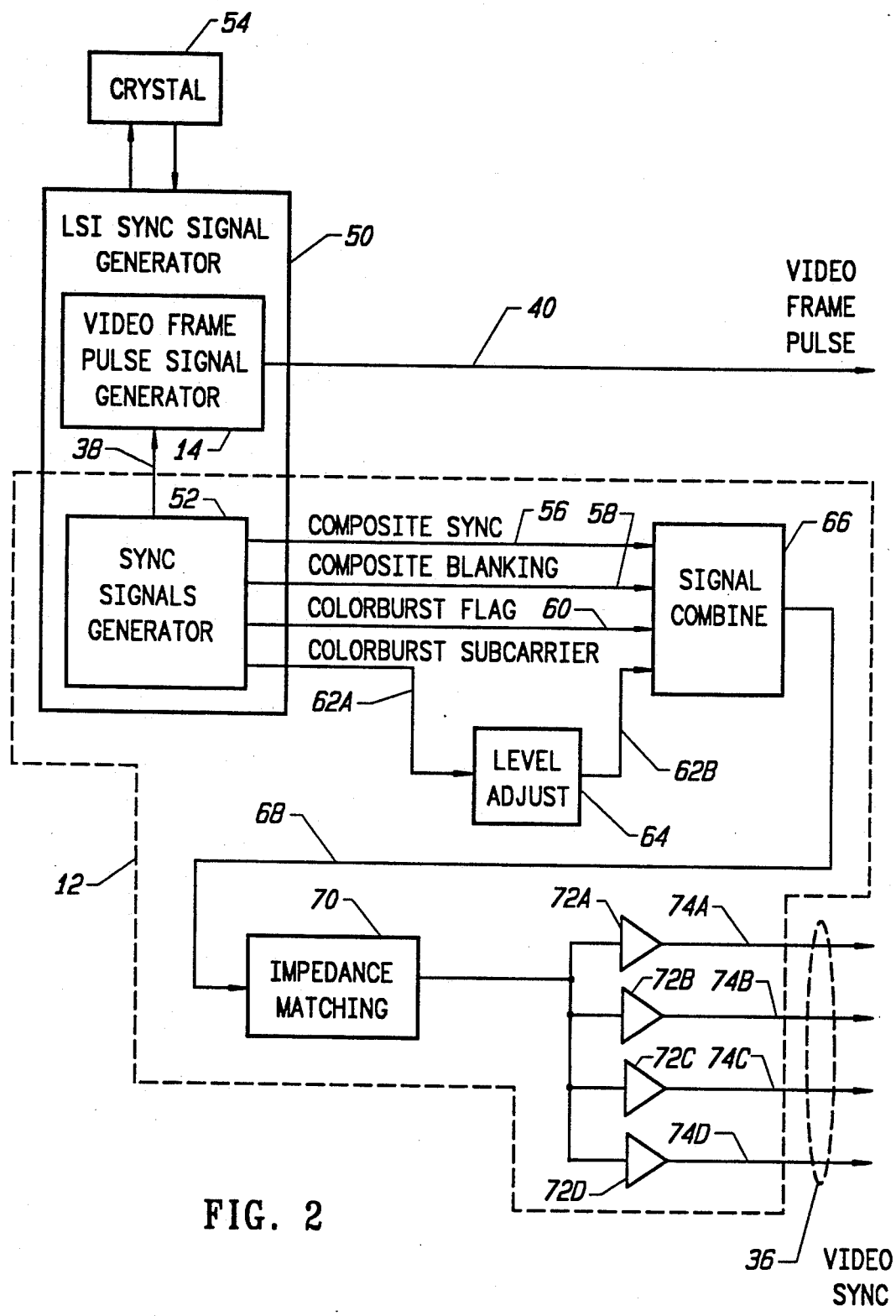
FIG. 2 illustrates in simplified, functional block diagram form a video synchronization generator used within a signal generator in accordance with the present invention.

Referring to FIG. 2, a preferred embodiment of the signal generator 10 uses a large scale integrated ("LSI") circuit 50 in generating the video sync signal 36 and video frame pulse signal 40. Integrated within the LSI sync signal generator 50 are circuits constituting the video frame pulse signal generator 14 and a sync signals generator 52. Using an external crystal 54 for its frequency reference, the LSI sync signal generator 50 generates composite sync 56, composite blanking 58, colorburst flag 60 and colorburst subcarrier 62a signals. The colorburst subcarrier signal 62a is passed through a level adjust circuit 64. The composite sync 56, composite blanking 58, colorburst flag 60 and level adjusted colorburst subcarrier 62b signals are combined together in a signal combiner 66 to produce a sync signal 68, i.e., video black burst signal.

This sync signal 68 goes through an impedance matching circuit 70 before being divided substantially equally among four video buffer amplifiers 72a-72d. Each of the output signals 74a-74d from the buffer amplifiers 72a-72d is a video sync signal, i.e., video black burst signal, and collectively make up the video sync signal 36 shown in FIG. 1.

It will be appreciated that the signal combining circuit 66 can be based upon any of several types of designs known in the art, depending upon the formats of its input signals 56, 58, 60, 62b. For example, a multiple channel analog multiplexor can be used to time-division multiplex the input signals 56, 58, 60, 62b to generate the sync signal 68. Alternatively, an analog voltage or current summing circuit can be used, along with appropriately designed DC level shifters, to sum the input signals 56, 58, 60, 62b to produce the sync sum signal 68.

The impedance matching circuit 70 is used to match the relatively high output impedance of the signal summing circuit 66 to the relatively low input impedance of the parallel combination of four video amplifiers 72a-72d. Such impedance matching circuits and their possible configurations are quite common and well known in the art. Similarly, the video amplifiers 72a-72d are quite common and well known in the art.

Figure 3:
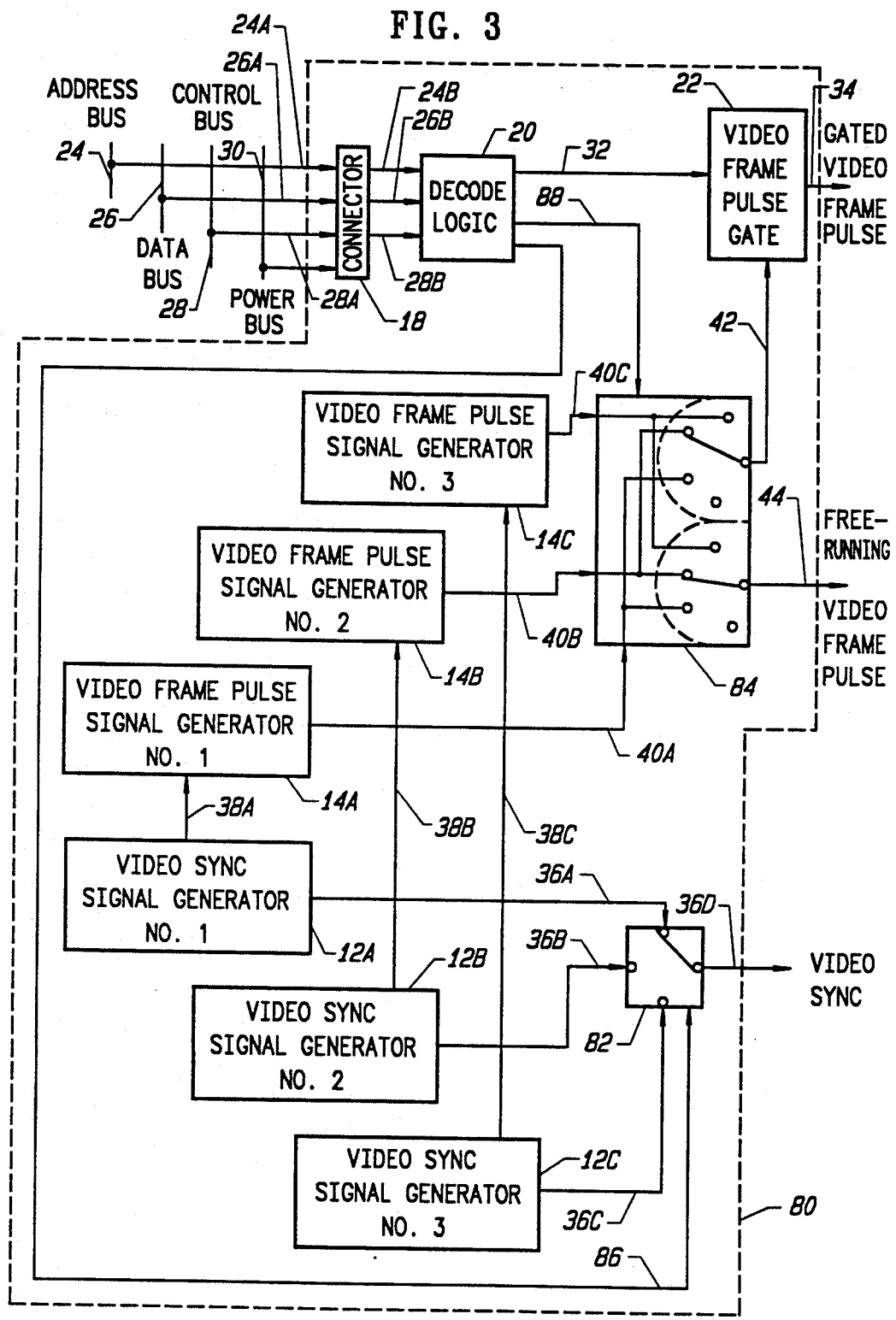
FIG. 3 illustrates in simplified, functional block diagram form an alternative preferred embodiment of a signal generator in accordance with the present invention.

Referring to FIG. 3, an alternative preferred embodiment 80 of the present invention has multiple video sync signal generators 12a-12c and video frame pulse signal generators 14a-14c. Similar to the configuration of FIG. 1 discussed above, each video frame pulse signal generator 14a-14c receives a frame pulse sync signal 38a-38c for generating and synchronizing their video frame pulse signal outputs 40a-40c with the corresponding video sync signal outputs 36a-36c.

Further included in this alternative preferred embodiment 80 are a video sync signal switch 82 and a video frame pulse signal switch 84 (the latter switch 84 replacing the signal switch 16 of FIG. 1). These switches 82, 84, in accordance with control signals 86, 88 derived from the host computer (not shown) via the connector 18 and decoding logic 20, select from among the multiple video sync signals 36a-36c and video frame pulse signals 40a-40c to produce the video sync output 36d, free-running video frame pulse signal 44, or frame pulse signal 42 (also free-running at this point) for potential gating by the video frame pulse gate 22.

The video sync signal switch 82 is functionally a single-pole, triple-throw coupling or switch means, e.g., a solid state electronic or electromechanical switch. Its throws receive the video sync signals 36a-36c and its pole provides the video sync output 36d. The video frame pulse signal switch 84 is functionally two independently operable single-pole, triple-throw coupling or switch means, e.g., solid state electronic or electromechanical switches. Their throws receive the video frame pulse signals 40a-40c, and their poles provide the free-running video frame pulse signal 44 and the frame pulse signal 42 (also free-running at this point) for potential gating by the video frame pulse gate 22.

Similar to the generating of the video frame pulse gate control signal 32, as discussed above, the video sync switch control signal 86 and video frame pulse switch control signal 88 are generated in accordance with the address signal 24b, data signal 26b, control signal 28b and decoding logic 20 design. Also as discussed above, any of these signals can be single-bit or multiple-bit signals, as desired. Further, it will be appreciated that some or all of these control signals 32, 86, 88 can be identical signals and share common signal paths, as desired.

Therefore, under control by the host computer, the desired video sync signal 36d and corresponding desired video frame pulse signals 42, 44 can be selected from among the video sync signals 36a-36c and video frame pulse signals 40a-40c, respectively. For example, each video sync signal generator 12a-12c can be operating in accordance with a different video standard, e.g., NTSC, PAL, SECAM, etc.

Figure 4:
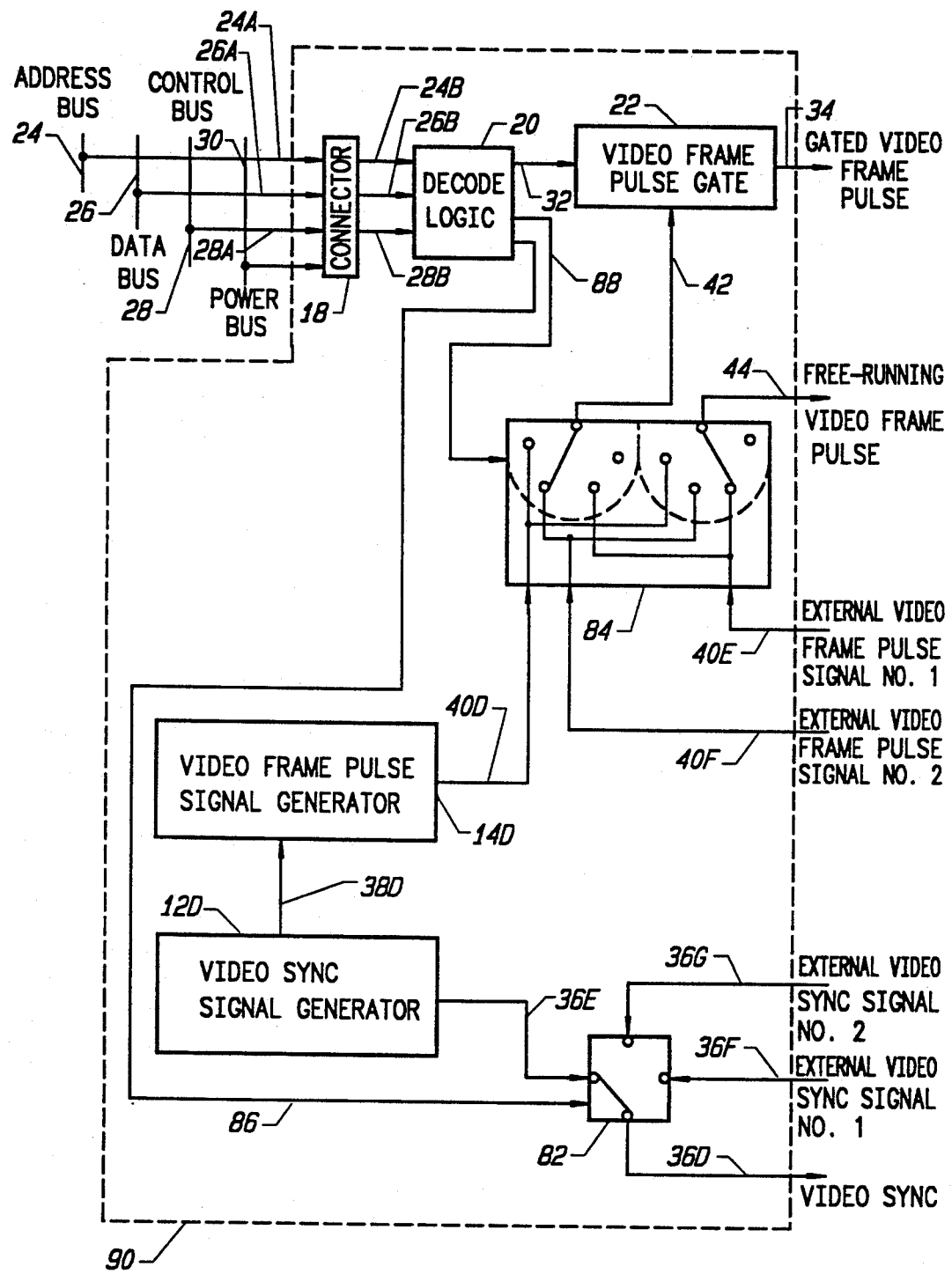
FIG. 4 illustrates in simplified, functional block diagram form another alternative preferred embodiment of a signal generator in accordance with the present invention.

Referring to FIG. 4, another alternative preferred embodiment 90 of the present invention provides internal video sync 12d and internal video frame pulse 14d signal generators, with means for receiving externally generated video sync signals 36f, 36g and externally generated video frame pulse signals 40e, 40f. In this embodiment 90, the video sync switch 82, in accordance with its control signal 86, selects from among the internal 36e or external 36f, 36g video sync signals for outputting as the selected video sync signal 36d. Similarly, the video frame pulse switch 84, in accordance with its control signal 88, selects from among the internal 40d or external 40e, 40f video frame pulse signals for transferring as the selected video frame pulse signal 42 destined to become the gated video frame pulse signal 34, or for outputting as the free-running video frame pulse signal 44.

It should be understood that various alternatives to the embodiments of the present invention described herein can be employed in practicing the present invention. It is intended that the following claims define the scope of the present invention and that structures and methods within the scope of these claims and their equivalents be covered thereby.

What is claimed is:

1. A self-contained, computer controllable, video synchronization and frame pulse signal generator comprising:
   a first video synchronization circuit coupled to generate a first video synchronization signal;
   a second video synchronization circuit coupled to generate a second video synchronization signal;
   a first video switch circuit coupled to receive the first and second video synchronization signals and to provide a switched video synchronization signal;
   a first video frame pulse circuit coupled to the first video synchronization circuit and further coupled to generate a first video frame pulse signal indicating the presence of a first video signal frame;
   a second video frame pulse circuit coupled to the second video synchronization circuit and further coupled to generate a second video frame pulse signal indicating the presence of a second video signal frame;
   a second video switch circuit coupled to receive the first and second video frame pulse signals and to selectively provide at least one switched video frame pulse signal; and
   a computer controllable gating circuit coupled to selectively gate one of the switched video frame pulse signals.

2. A signal generator as recited in claim 1 further comprising a circuit board, wherein the first and second video synchronization circuits, the first and second video frame pulse circuits, the first and second video switch circuits, and the computer controllable gating circuit are electrically coupled to the circuit board.

3. A signal generator as recited in claim 2 for use with an external personal computer of the type having a signal bus and further comprising an electrical connector which is mechanically and electrically connected to the circuit board for coupling to the signal bus within the personal computer.

4. A signal generator as recited in claim 1, wherein the computer controllable gating circuit is coupled to selectively generate an interrupt request signal dependent upon one of the switched video frame pulse signals.

5. A signal generator as recited in claim 1, wherein the first video synchronization circuit is coupled to generate an NTSC video black burst signal.

6. A signal generator as recited in claim 1, wherein the first video synchronization circuit is coupled to generate a PAL video black burst signal.

7. A signal generator as recited in claim 1, wherein the first video synchronization circuit is coupled to generate a PAL-M video black burst signal.

8. A signal generator as recited in claim 1, wherein the first video synchronization circuit is coupled to generate a SECAM video black burst signal.

9. A signal generator as recited in claim 1, wherein the first video synchronization circuit is coupled to generate a high definition video synchronization signal.

10. A self-contained, computer controllable, video synchronization and frame pulse signal generator comprising:

an internal video synchronization circuit coupled to generate an internal video synchronization signal;

a first video switch circuit coupled to receive the internal video synchronization signal, to receive an externally generated video synchronization signal, and to provide a switched video synchronization signal;

an internal video frame pulse circuit coupled to the internal video synchronization circuit and further coupled to generate an internal video frame pulse signal indicating the presence of a first video signal frame;

a second video switch circuit coupled to receive the internal video frame pulse signal, to receive an externally generated video frame pulse signal indicating the presence of a second video signal frame, and to selectively provide at least one switched video frame pulse signal; and a computer controllable gating circuit coupled to selectively gate one of the switched video frame pulse signals.

11. A signal generator as recited in claim 10 further comprising a circuit board, wherein the internal video synchronization circuit, the internal video frame pulse circuit, the first and second video switch circuits, and the computer controllable gating circuit are electrically coupled to the circuit board.

12. A signal generator as recited in claim 11 for use with an external personal computer of the type having a signal bus and further comprising an electrical connector which is mechanically and electrically connected to the circuit board for coupling to the signal bus within the personal computer.

13. A signal generator as recited in claim 10, wherein the computer controllable gating circuit is coupled to selectively generate an interrupt request signal dependent upon one of the switched video frame pulse signals.

14. A signal generator as recited in claim 10, wherein the internal video synchronization circuit is coupled to generate an NTSC video black burst signal.

15. A signal generator as recited in claim 10, wherein the internal video synchronization circuit is coupled to generate a PAL video black burst signal.

16. A signal generator as recited in claim 10, wherein the internal video synchronization circuit is coupled to generate a PAL-M video black burst signal.

17. A signal generator as recited in claim 10, wherein the internal video synchronization circuit is coupled to generate a SECAM video black burst signal.

18. A signal generator as recited in claim 10, wherein the internal video synchronization circuit is coupled to generate a high definition video synchronization signal.

* * * * *